E. WITZIGMAN.
Seeding-Machines.
No. 144,879.     Patented Nov. 25, 1873.
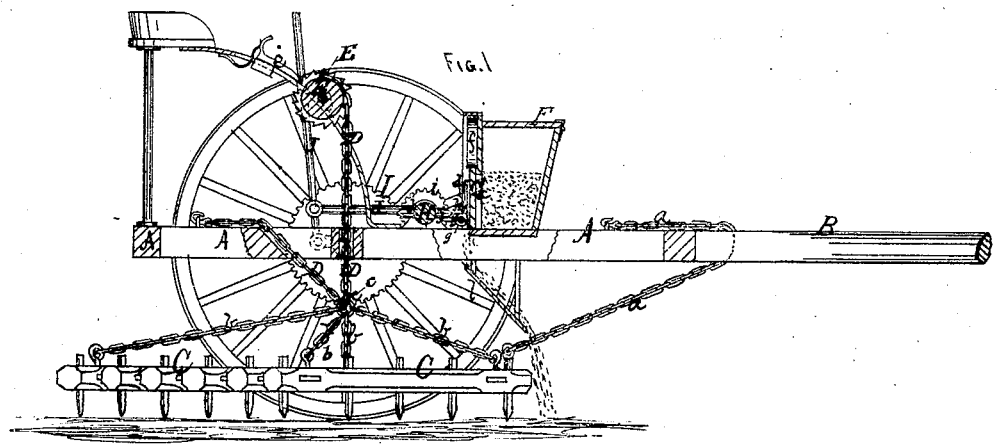
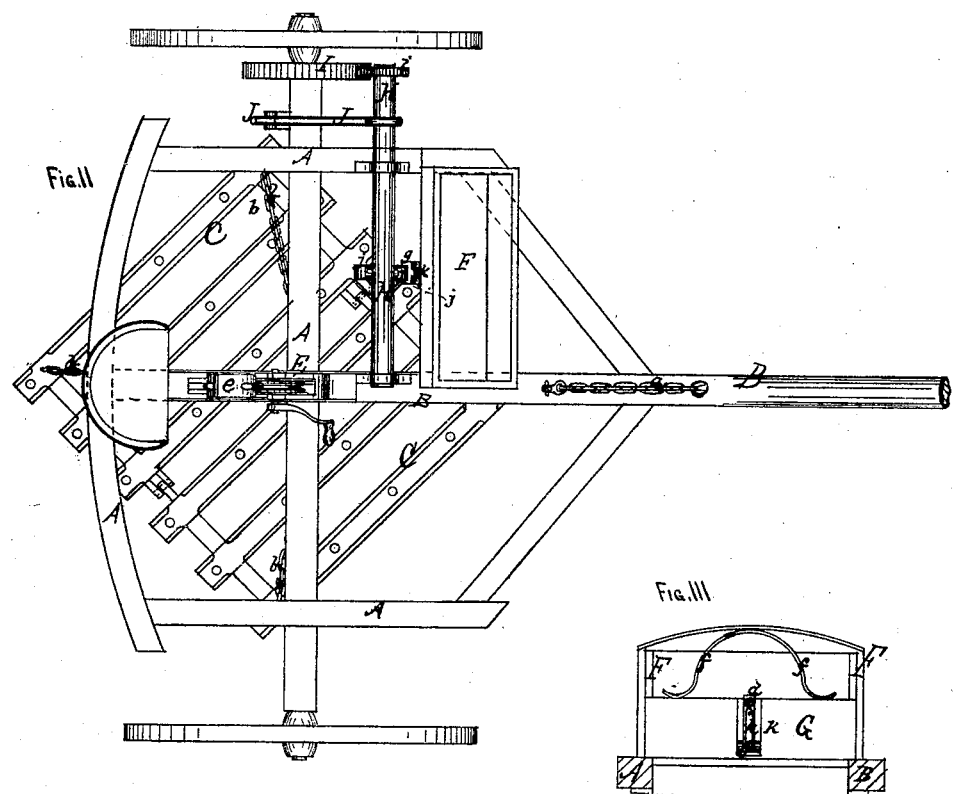
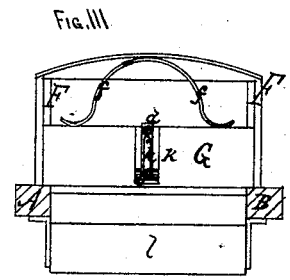
Witnesses.
J. Pxx. Drake
C. N. Woodward
Edward Witzigman
INVENTOR, BY
Burke Fraser & Co.
Attys

UNITED STATES PATENT OFFICE.

EDWARD WITZIGMAN, OF BUFFALO, NEW YORK.

IMPROVEMENT IN SEEDING-MACHINES.

Specification forming part of Letters Patent No. 144,879, dated November 25, 1873; application filed August 27, 1873.

*To all whom it may concern:*

Be it known that I, EDWARD WITZIGMAN, of Buffalo, in the county of Erie and State of New York, have invented certain new and useful Improvements in Combined Seed-Sowers and Drags, of which the following is a specification:

The invention consists of a seed-box having a door-valve, at the front of which is located a spring-catch, which is operated by means of cams or pins on the operating-shaft, so that the door is raised to drop the seed, and when the cams cease to act the door is closed by a spring until the next revolution of the shaft. The door is regulated by a set-screw, so that it may be opened more or less, as occasion demands.

In the drawings, Figure 1 is a sectional side elevation, Fig. 2 is a plan, Fig. 3 is a rear elevation, of the seed-box, &c.

A A' represent the frame-work, and B the tongue, of the sulky. Directly beneath the frame is a hinged drag, C, attached to the frame or tongue by means of a chain or chains, $a$, so arranged that it can be lengthened or shortened, to regulate the distance at which the drag shall work. Attached to each corner of the drag are chains $b\ b\ b\ b$, or their equivalents, which are all connected together at a central point by means of a ring, $c$, or its equivalent. D is another chain, which is attached to the central frame or continuation of the tongue B, as shown in Fig. 1, and passes downward through it and the ring $c$, and then upward again through the tongue, and is attached to a grooved wheel or windlass, E, near the seat, having a series of ratchet-teeth and a spring-pawl, $e$, to hold it at any point; the whole enabling the drag to be elevated by the driver, and held at any height, so as to work any depth, or to be raised entirely from the earth for transportation, &c., or to pass over stones and other obstructions. F is a seed box or trough, secured to the frame A on one side, as shown in Fig. 2, and provided with a sliding door or valve, G, at the back, held down by a spring, $f$, or its equivalent, arranged over it. Attached to the front of valve G is a small catch, $g$, hinged in suitable ears or lugs, and which has a small lug, $h$, rising up from the back, which presses against the valve G, and thus assists the latter to be raised. H is a shaft, running parallel with and at a short distance behind the seed-box F, and which is revolved by means of a gear-wheel, I, and pinion $i$, the former being attached to and revolving with one of the wheels of the sulky. Near the center of this shaft H are one or more pins or cams, $j.j'$, which, revolving with the shaft, act upon the spring-catch $g$, and cause the door or valve G to be raised to allow the seed to run out; and when the cam has released it, the spring $f$ will throw it back again to its place until raised again by the next revolution of the shaft, and so on, thus alternately opening the valve G, and allowing the seed to escape in regular quantities. The door or valve is made to work higher or lower by means of a set-screw, $d$, setting the catch up or down, to drop out more seed if wider, and less if the opening is made narrower. A slanting step or chute is arranged underneath the seed-box, so that the seed falling first upon it is thrown out at a greater distance and scattered more.

When not desired to operate the seed-box, I throw the shaft H out of gear by means of a series of levers worked by the driver from his seat, the bearing on that end of the shaft H being made slightly movable for that purpose.

If it should be required to move the machine backward, the shaft H will revolve in the opposite direction, and if the lug $g$ were made rigid it would be broken off; but I prevent this by making it movable, so that the cams merely throw it downward, and it is immediately returned to its place by a spring, $k$, attached above it, as shown. It will be so arranged that any style of seed sower and drag may be connected together; or this can be entirely disconnected, to enable them to be used separately.

The advantages of using the two combined are very great. As fast as the seed is dropped from the drill, the teeth of the drag throw it under and cover it up, saving all the extra labor of men, horses, &c., and time required to use separate devices for the same purposes.

I claim—

In a sulky seed-sower, the seed-box F, when constructed with the valve or door G, spring $f$, catch $g$, lug $h$, and set-screw $d$, in combination with the shaft H, cams or pins $jj$, and step $e$, all arranged to operate in the manner and for the purpose substantially as specified.

In witness whereof I have hereunto signed my name in the presence of two subscribing witnesses.

EDWARD WITZIGMAN.

Witnesses:
J. R. DRAKE,
C. N. WOODWARD.